United States Patent [19]

Shimazaki et al.

[11] Patent Number: 5,860,127
[45] Date of Patent: Jan. 12, 1999

[54] CACHE MEMORY EMPLOYING DYNAMICALLY CONTROLLED DATA ARRAY START TIMING AND A MICROCOMPUTER USING THE SAME

[75] Inventors: Yasuhisa Shimazaki, Tachikawa; Seiichi Nagata, Kodaira; Katuhiro Norisue, Ome; Koichiro Ishibashi, Warabi; Junichi Nishimoto, Hachioji, all of Japan; Shinichi Yoshioka, Stanford, Calif.; Susumu Narita, Kokubunji, Japan

[73] Assignees: Hitachi, Ltd.; Hitachi ULSI Engineering Co., Ltd., both of Tokyo, Japan

[21] Appl. No.: 653,278

[22] Filed: May 24, 1996

[30] Foreign Application Priority Data

Jun. 1, 1995 [JP] Japan .................................. 7-135171

[51] Int. Cl.$^6$ .................................................. G06F 12/06
[52] U.S. Cl. .......................................... 711/167; 395/559
[58] Field of Search .................................. 395/445, 494, 395/550, 559; 711/118, 167

[56] References Cited

U.S. PATENT DOCUMENTS

| | | | |
|---|---|---|---|
| 4,502,110 | 2/1985 | Saito | 711/123 |
| 4,803,616 | 2/1989 | Uchiyama et al. | 395/872 |
| 5,014,195 | 5/1991 | Farrell et al. | 711/128 |
| 5,018,061 | 5/1991 | Kishigami et al. | 711/3 |

OTHER PUBLICATIONS

"Cache Memories" by Alan Jay Smith, Computing Surveys, vol. 14, No. 3, (1982) pp. 473–530.
"Computer Organization & Design—The Hardware/Software Interface" Morgan Kaufmann Publishers, (1994) pp. 454–527.
Nikkei Electronics, Feb. 14, 1994, pp. 79–92.
Nikkei Electronics, Mar. 27, 1995 pp. 13–20.

*Primary Examiner*—Eddie P. Chan
*Assistant Examiner*—Kevin L. Ellis
*Attorney, Agent, or Firm*—Antonelli, Terry, Stout & Kraus, LLP

[57] ABSTRACT

A comparator is constituted such that a hit signal $\phi$hit is high, before hit check is established in each way of an address array, and such that the hit signal goes low, when a mishit has been established. When a clock frequency is relatively high, the address array is activated by the first clock signal, and thereafter, all ways of a data array are activated by the second clock signal before the hit check in the address array is established. When the hit check has been established, data read from a way in the data array which has hit is immediately outputted onto a data line and an operation in the way which has mishit is stopped. This novel constitution realizes a high-speed cache operation. When the clock frequency is relatively low, only a way in the data array that has hit is activated after completion of the hit check, thereby reducing power consumption at a low-speed operation.

23 Claims, 9 Drawing Sheets

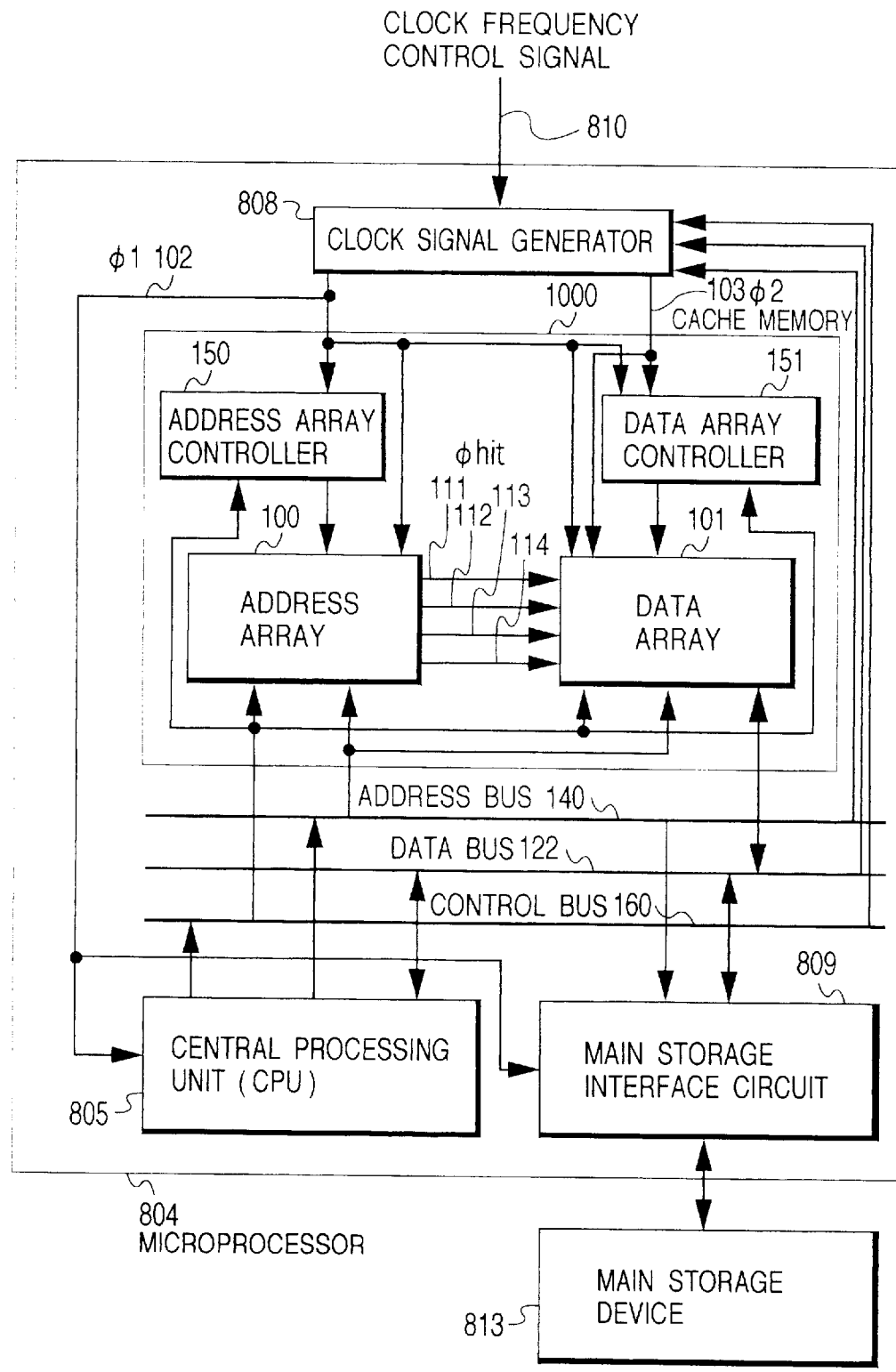

CACHE MEMORY EMPLOYING DYNAMICALLY CONTROLLED DATA ARRAY START TIMING AND A MICROCOMPUTER USING THE SAME

BACKGROUND OF THE INVENTION

The present invention relates to a cache memory and, more particularly, to a cache memory suitable for use as incorporated in a microprocessor.

The cache memory is smaller than the main memory in storage capacity but faster in access. Therefore, the cache memory is located very close to the central processing unit (CPU) for the purpose of supplying data held in the main memory to the CPU. A variety of problems about the cache memory are discussed in the ACM, Computing Surveys, Vol. 14, No. 3, 1994, pp. 473–530 and "Computer Organization & Design—The Hardware/Software Interface," Morgan Kaufmann Publishers, pp. 454–527, 1994, for example. The main problems of the cache memory are access time and power consumption.

An example of a conventional cache memory of relatively small power consumption is shown in the NIKKEI Electronics, Feb. 14, 1994, pp. 79–92 (this cache memory is hereinafter referred to as the first prior-art technology). FIG. 2 shows a block diagram of the first prior-art technology.

As shown, the cache memory according to the first prior-art technology is a four-way set-associative cache memory. The set-associative memory is provided as follows. Namely, a plurality of areas that can hold data in a size of blocks in the cache memory are divided into a plurality of rows and a plurality of columns. Each of areas in main memory (not shown) that can hold a data block is divided into a plurality of columns corresponding to the above-mentioned plurality of columns. Block storage areas in the same column in main memory are associated with a given block storage area in the cache memory column corresponding to that same column.

To be more specific, as shown in FIG. 2, in the prior-art cache memory, an address array 200 is composed of four memory mats (also called ways) 206 (namely, way 0, way 1, way 2, and way 3), a decoder 205 commonly provided for these ways, and a precharge and equalize circuit 207, a sense amplifier 208, and a comparator 209 provided for each of the ways. Likewise, a data array 201 is composed of four memory mats 218 (namely, way 0, way 1, way 2, and way 3) and an address decoder 217, a precharge and equalize circuit 219, a sense amplifier 220, and an output buffer 221 provided for each of the ways.

The above-mentioned prior-art cache memory operates as follows. First, access to the four ways 206 is started according to a middle address Am entered from a line 204. Addresses registered in the way 0, the way 1, the way 2, and the way 3 are read and are outputted from the sense amplifiers 208 provided for respective ways (these addresses are also referred to as tags). In the comparator 209 provided for each way, an upper address Au entered from a line 210 is compared with the address read from each way. If a match is found, namely if the cache memory has hit, the comparator 209 asserts a corresponding hit line 211, 212, 213 or 214. Conversely, if a mismatch is found, namely if the cache memory has not hit, the comparator 209 leaves the corresponding hit line negated.

Of the four ways of the data array 200, only one way for which the address array 100 has hit, is activated by the corresponding hit line.

Consequently, the above-mentioned prior-art technology is advantageous in power saving. However, the access time of the entire cache memory is a sum of the access time of the address array 200, the time required for the comparison operation in the comparator 209, and the access time of the data array 201, resulting in a relatively large value. This makes it difficult to enhance the operating frequency of the cache memory.

To overcome such a problem, the present inventors considered a method in which the address array is activated at the same time the data array is activated. FIG. 3 shows a block diagram of a four-way set-associative cache memory 3000 that operates in this method (this cache memory is called a reference technology hereinafter). In FIG. 3, the structures of an address array 300 and a data array 301 are generally the same as those of FIG. 2. The difference between the prior-art technology of FIG. 2 and the reference technology of FIG. 3 lies in that, when the address array 300 is activated, the data array 301 is activated at the same time. The data held in an output buffer 321 of one way among the four ways of the data array 301 corresponding to a way in which hit occurred in the address array 300 may only be outputted to a data line 322. In this method, the address array 300 and the data array 301 are accessed simultaneously, so that the access time of the entire cache memory 3000 is approximately equal to the access time of the data array 301. Thus, the access time of the entire cache memory is relatively short. In this method, however, a way in the data array corresponding to a way in which no hit occurred in the address array is also accessed, so that the power consumption of the data array increases significantly. Further, even if the operating frequency of the cache memory is lowered, the data array operates in the same manner as mentioned above, and therefore, the power consumption is not reduced.

The NIKKEI Electronics, Mar. 27, 1995, pp. 1320 introduces a new RISC (Reduced Instruction Set Computer) processor (a second prior-art technology hereinafter) developed by the assignee hereof and others. Especially, page 16 of the same publication describes a technology for suppressing cache power consumption that follows. Namely, SH7708 employed three methods of suppressing cache power consumption. In the first method, only a way in which hit occurred in the address array is driven. This method was also employed in SH7604, but it is impossible to drive the data array after address array hit determination at high-speed operations, because of the limitation of circuit speed in SH7708. Hence, a circuit constitution for dynamically determining a drive timing of a data array was provided and, if hit determination cannot be made in time, all four ways of the data array are driven. The limit of the frequency for selectively driving one way of the data array is about 40 MHz.

SUMMARY OF THE INVENTION

As mentioned above, the cache memory according to the first prior-art technology can operate with somewhat small power consumption but is it difficult to enhance an access speed of this cache memory. The second prior-art technology does not describe how concretely power consumption was reduced.

It is therefore an object of the present invention to provide a cache memory that can operate at a relatively high speed and consumes a somewhat small amount of power at least in a low-speed operation.

It is another object of the present invention to provide a cache memory that can reduce power consumption at a high-speed operation and further reduce power consumption at a low-speed operation.

It is still another object of the present invention to provide a cache memory that can operate at a considerably high frequency, reduce power consumption in an operation at a relatively low frequency, and also reduce power consumption in an operation at a relatively high frequency located between the above-mentioned considerably high and low frequencies.

In attaining the above-mentioned objects, a cache memory according to the present invention has, in addition to a first start circuit for activating an address array in response to a read request which requests readout of data from another memory, a second start circuit for activating a data array after activating the address array. The second start circuit has a start execution circuit for dynamically selecting and executing one of a first start operation for activating the data array before completion of a hit check operation after the start of the address array and a second start operation for activating the data array after the hit check operation completes and it is determined that the address array has hit. As the first start operation realizes a high-speed operation because it does not wait for completion of a hit check operation and the second start operation realizes a low power consumption operation because it activates only a hit way in the data array.

To be more specific, the above-mentioned start execution circuit has a circuit that selectively executes the first and second start operations depending on a clock frequency of a clock signal for controlling the operations of the above-mentioned cache memory. This circuit allows automatic switching between a high-speed operation and a low-speed but a low power consuming operation depending on an operating frequency.

To be further specific, the first and second start circuits respectively activate the address array and the data array in response to a first clock signal and a second clock signal having the same frequency as the first clock signal and delayed behind the first clock signal by a predetermined phase. The phase difference is maintained at a substantially constant level even when the frequencies of these clock signals are changed. This allows the automatic selection between the above-mentioned first and second start operations such that these operations are performed respectively when the frequencies of the clock signals are high and low.

In another mode of a cache memory according to the present invention, an address array and a data array are each divided into a plurality of ways, and in addition to a first start circuit for activating address information holding ways in parallel, a second start circuit is provided for activating a plurality of data holding ways in parallel after activating reading of address information before completing a hit check operation for the address information. In addition, the cache memory has an output control circuit that instructs one data holding way corresponding to one of the address information holding ways to output the data read by that data holding way, if it has been found by the hit check operation in the address array that the one address information holding way has hit array. As the plural ways of the data array are activated before completion of the hit check operation, the data held in the way that has hit can be read quickly after the completion of the hit check operation.

In another mode of the present invention, the above-mentioned second start circuit has a circuit for activating the plurality of data holding ways in the timing in which data are read therefrom after completion of a hit check operation, and the cache memory further has a circuit that instructs those data holding ways which have not hit to stop the data read operation under execution. This novel constitution can immediately stop the operations of the data holding ways that have not hit. Consequently, power saving is realized in the data holding ways that have not hit.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 9 is a schematic block diagram of a microprocessor which uses the cache memory of FIG. 1.

DESCRIPTION OF AN EMBODIMENT

Figure 1:
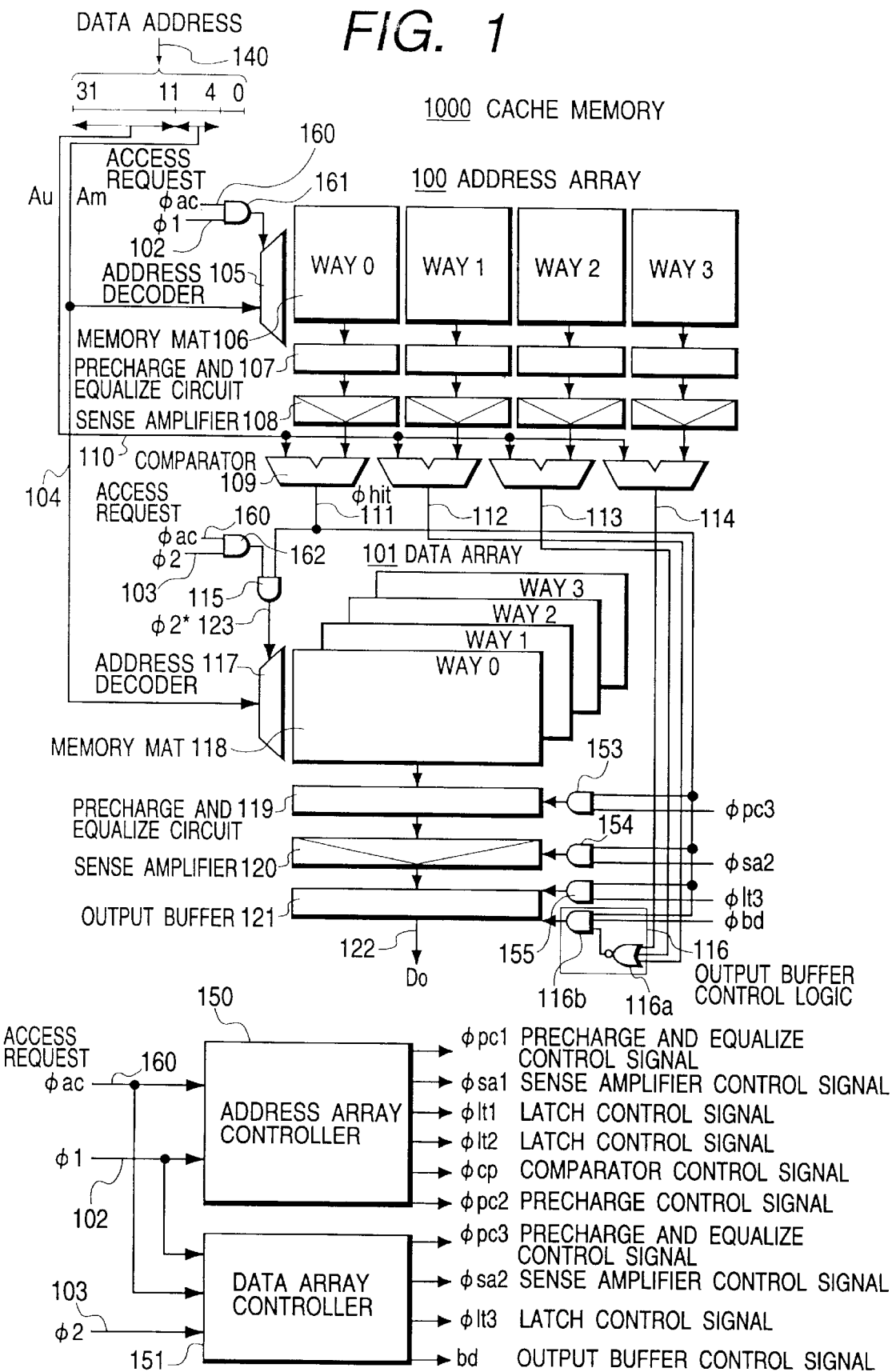
FIG. 1 is a schematic block diagram of a cache memory according to the present invention.

This invention will be described in further detail by way of example with reference to the accompanying drawings.

(1) Outline of the device:

FIG. 9 shows one embodiment of a microprocessor system using a cache memory according to the present invention. In FIG. 9, reference numeral 804 indicates a microprocessor and reference numeral 813 indicates a main memory device. The microprocessor 804 is formed on a large scale integration (LSI) circuit and composed of a central processing unit (CPU), a cache memory 1000, a main memory interface unit 809, and a clock signal generator 808. The other circuits of the microprocessor are not shown for simplicity.

The cache memory 1000 is composed of an address array 100, a data array 101, an address array controller 150, and a data array controller 151. Read/write operations on the cache memory 1000 are performed generally in the same manner as the prior-art technology. That is, when a memory access instruction is executed in the CPU 805, a memory reference address is supplied to the cache memory 1000 via an address bus 140. A memory access request is supplied to the cache memory 1000 via a control bus 160. The address array performs a hit check operation by using this memory reference address and supplies a check result to the data array 101 via hit lines 111–114.

For example, if this memory access instruction is for requesting readout of data from the main memory device 813, the data array 101 supplies hit data based on the memory reference address supplied from the line 104 to the CPU via the data bus 122, when the hit check result supplied from the lines 111–114 indicates a cache hit. If the hit check supplied from the lines 111–114 indicates a mishit, the data array 101 requests the main memory interface unit 809 to execute a memory read operation. The data read from the main memory device 813 read out in response to this request is sent to the CPU via the data bus 140 and, at the same time, is written into the data array 101. If the instruction executed in the CPU 805 is for writing data, write data outputted from the CPU is written into the data array 101 via the data bus 122.

In the present embodiment, the clock signal generator 808 gives clock signals φ1 and φ2 to the address array 100 and the data array 101, respectively. The clock signal φ2 has the same frequency as that of the clock signal φ1 but is delayed behind the clock φ1 by a predetermined phase. The clock signal generator 808 uses a PLL (Phase Locked Loop) circuit, not shown, to generate these clock signals such that the phase difference remains unchanged if the frequency of these signals varies. The clock signal generator 808 is constituted so that the frequency of the clock signals can be varied by a clock control signal supplied external to the microprocessor 804 via a line 810. Further, the clock signal generator 808 is also connected to buses 122, 140, and 160 and has a register, not shown, for holding control data supplied from the CPU via these buses. The frequency of the clock signals φ1 and φ2 are further varied according to this control data.

For example, in a normal operation, the frequency of these clock signals is set relatively high. When no instruction is being executed in the microprocessor 804 or the number of instructions in execution has decreased significantly, the frequency is set relatively low. When the microcomputer of the present embodiment is applied to a battery-driven portable terminal such as a PDA (Personal Digital Assistant), the frequencies are switched according to the type and operating status of the application program. For example, when high-performance processing is executed such as the recognition of hand-written characters or voices, the frequency of the clock signals φ1 and φ2 is set relatively high, while the same is set relatively low in a normal operation.

In the present embodiment, the cache memory 1000 is constituted such that the access time of the cache memory 1000 is shortened when the frequency of these clock signals is relatively high and the power consumption of the cache memory is reduced when the frequency is relatively low. The details will be described below.

FIG. 1 shows a block diagram of a four-way set-associative cache memory practiced as one embodiment of the present invention. It should be noted that a circuit for receiving requests for data read/write operations on the CPU, a circuit for outputting a read request to the main memory interface unit 809, and a circuit for receiving data from the same are not shown not for simplicity.

In FIG. 1, the cache memory 1000 has the address array 100, the data array 101, the address array controller 150, and the data array controller 151.

The address array 100 has a plurality of memory mats (also referred to as ways) 106 and an address decoder 105 provided commonly to the ways. Further, the address array 100 has a precharge and equalize circuit 107, a sense amplifier 108, and a comparator 109 for each of the ways.

Likewise, the data array 101 is composed of four memory mats (ways) 118 (way 0, way 1, way 2, and way 3). The data array has an address decoder 117 for each of the ways, an AND gate 115 for activating each address decoder 117 by an output of the corresponding comparator 109 in the address array 100, a precharge and equalize circuit 119, a sense amplifier 120, an output buffer 321, AND gates 153 through 155 for controlling the operation of the data array 101, and a control logic circuit 116. These AND gates and control logic circuit are provided for each of the ways of the data array 101. Shown in the figure are only those for the way 0 for simplicity.

The address array controller 150 generates a variety of signals for controlling the address array 100 in response to the clock signal φ1 when a memory access request φac has been given from the CPU via the line 160. The data array controller 151 generates a variety of signals for controlling the data array 101 in response to this clock signal φ1 and the clock signal φ2 when this memory access request φac has been given. The address array controller 150 and the data array controller 151 generate the above-mentioned control signals such that the phase difference between the control signals and the clock signals will not change even if the frequency of the clock signals changes.

Figure 6:
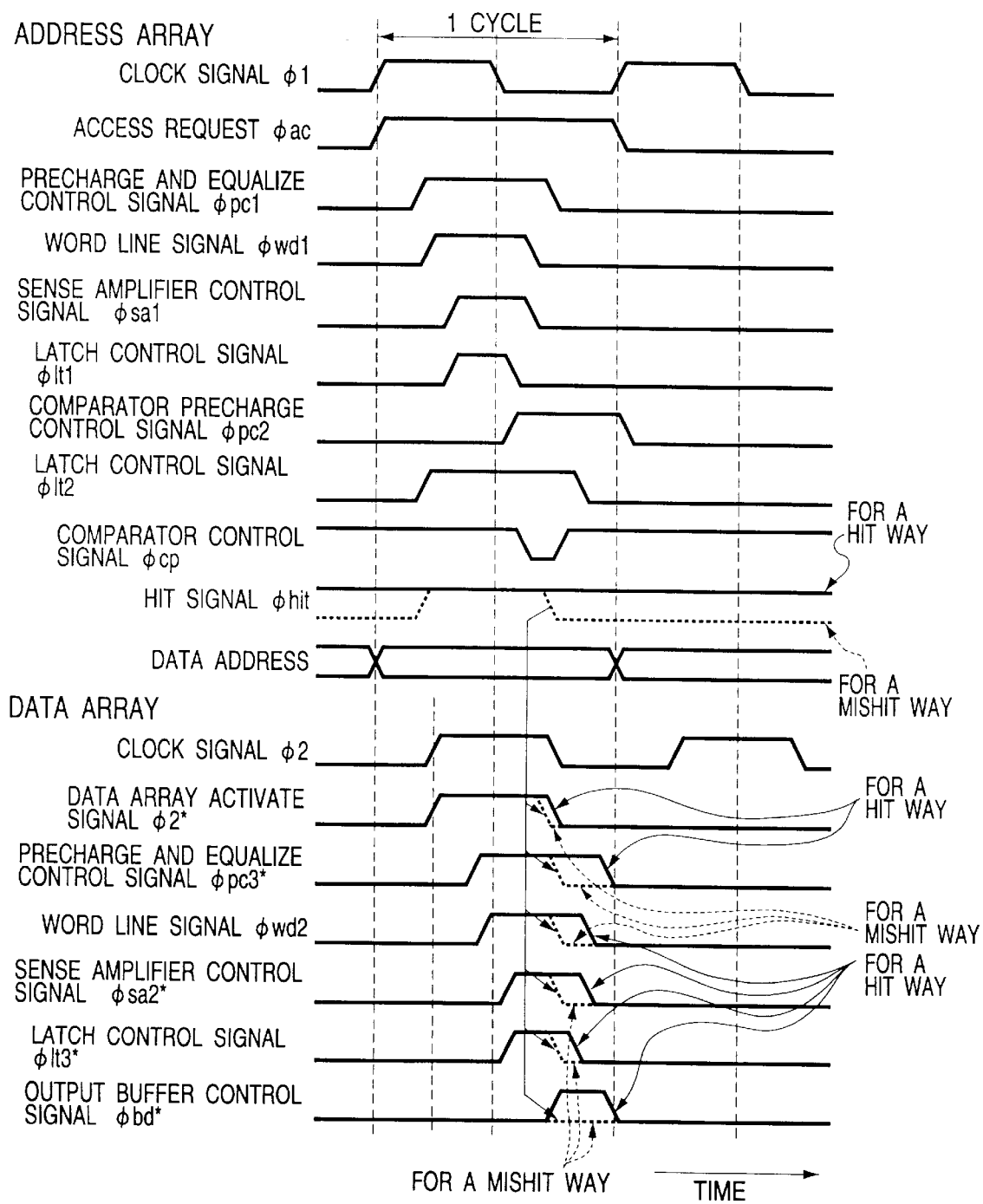
FIG. 6 is a timing chart of the cache memory of FIG. 1 at a considerably high operating frequency.
Figure 7:
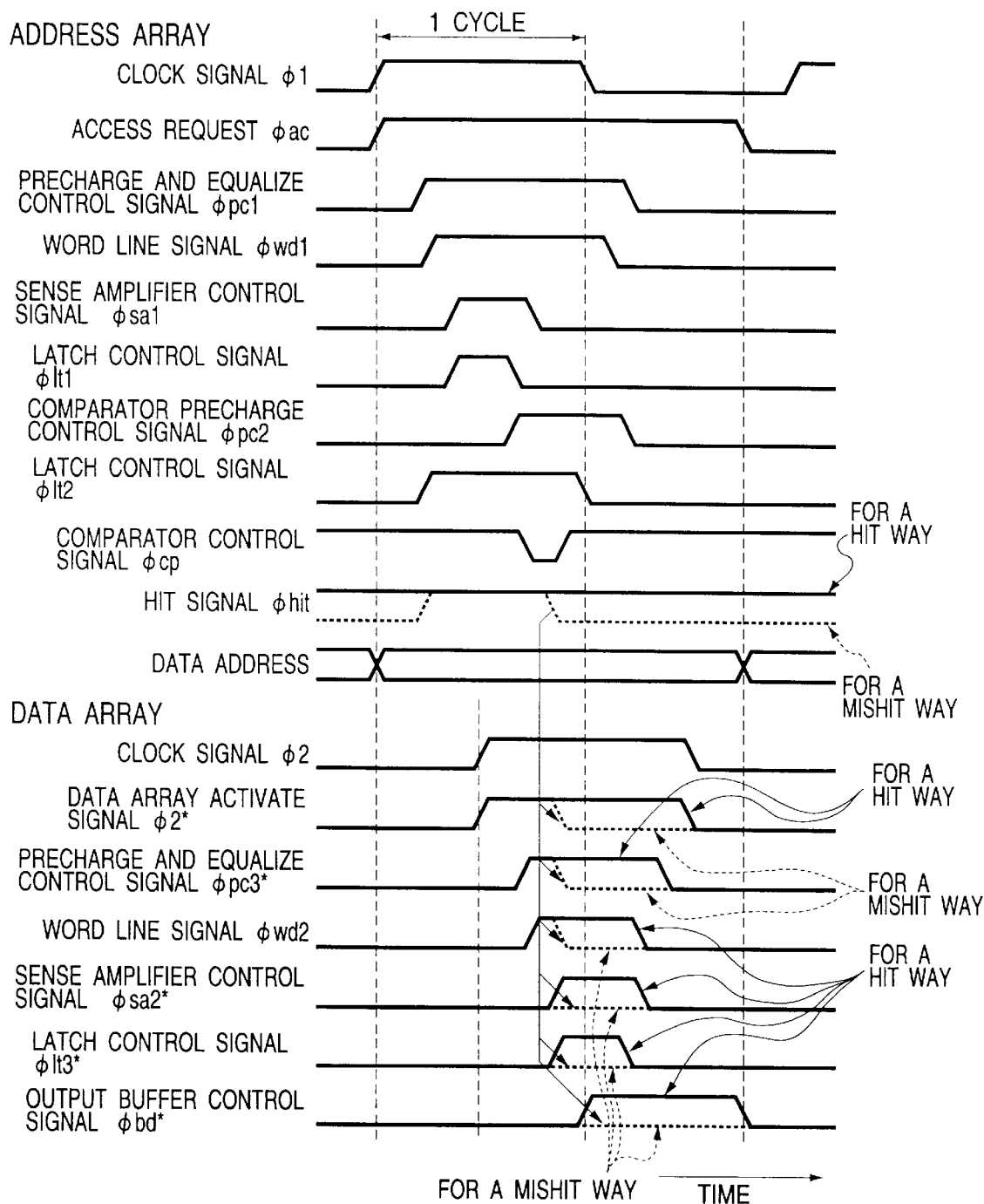
FIG. 7 is a timing chart of the cache memory of FIG. 1 at a relatively high operating frequency.
Figure 8:
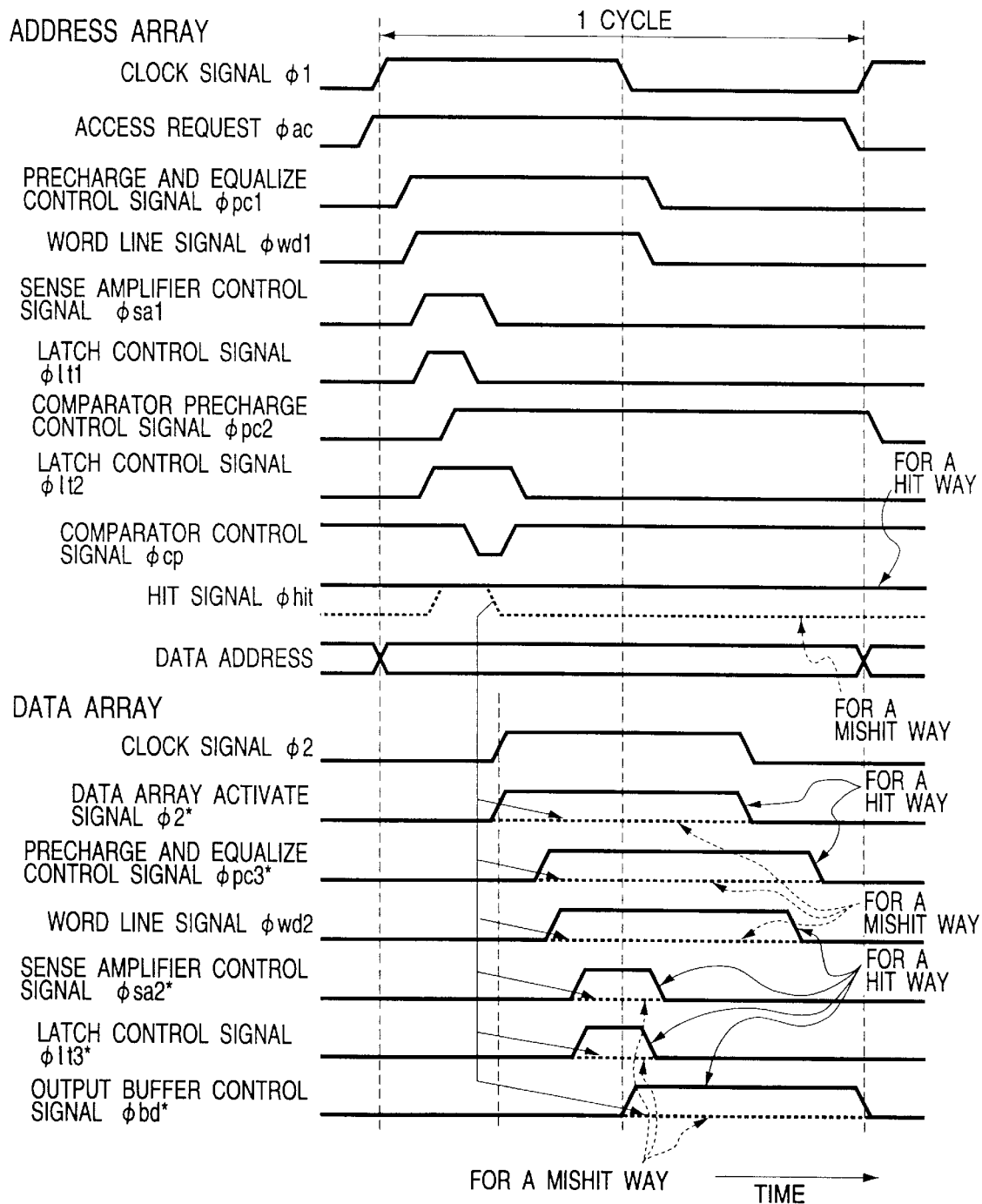
FIG. 8 is a timing chart of the cache memory of FIG. 1 at a relatively low operating frequency.

FIGS. 6 and 7 are timing charts indicating the main signals of the above-mentioned circuits when the frequency of the clock signals φ1 and φ2 is relatively high. The timing chart of FIG. 6 shows the case in which the frequency of the clock signals is considerably high; namely, higher than a threshold frequency 40 MHz to be described later, that is, the clock frequency is 60 MHz, for example. The timing chart of FIG. 7 shows the case in which the frequency is relatively high; namely, slightly higher than the above-mentioned threshold frequency, that is, the clock frequency is 50 MHz, for example. The timing chart of FIG. 8 shows the case in which the frequency of the clock signals is considerably low; namely, lower than the threshold frequency, that is, the clock frequency is 10 MHz, for example.

In these timing charts, a waveform represented in a broken line indicates an operating waveform of a way in which a cache mishit occurs, while a waveform represented in a solid line indicates an operating waveform of a way in which a cache hit occurs. A signal indicated with an asterisk (*) indicates a signal obtained by performing an AND operation of a signal indicated without the asterisk and a hit signal φhit by one of the AND gates 115, 153 through 155 and the output buffer control logic 116. It should be noted that a low frequency herein means a frequency to be used to save the power consumption when the microprocessor 804 is, for example, in the standby state. Therefore, the frequency of the clock signals of FIG. 8 is far lower than that of the clock signals of FIG. 6 or 7 but in FIG. 8, the length of the time axis is shown greater than that of FIG. 6 or 7 for simplicity.

The present embodiment has a feature in that the activation time of each way of the data array 101 and the end time of the activation are controlled by the AND gates 160, 115, 153 through 155, and 116b.

As seen from these timing charts, the present embodiment has the following improvements:

(a) When the clock frequency is high, the phase difference between the clock signal φ2 and other control signals and the clock signal φ2 is determined such that all data array ways can be activated at a time before a time at which the hit check signal φhit is outputted from the comparator 109 of each way in the address array 100 by a margin greater than the operating time of each data array way.

Namely, the clock signal φ2 has a phase difference delayed behind the clock signal φ1 by 90 degrees, and, if the frequency of the clock φ1 is higher than the threshold frequency, 40 MHz, for example, the time difference between the clock signal φ1 and the clock signal φ2 gets smaller. Therefore, as shown in FIG. 6 or 7, the clock signal φ2 rises before the address array hit signal φhit begins falling. This causes the data of the data array way corresponding to the hit way to be outputted from the output buffer 121 to data line 122 at the time the hit check signal φhit is established by each comparator 109, resulting in a shortened time required for cache memory reference as with the reference technology of FIG. 3. It should be noted that the above-mentioned threshold frequency depends on device structure and is therefore illustrative only herein. The same holds true with the following examples of values of other frequencies.

Figure 2:
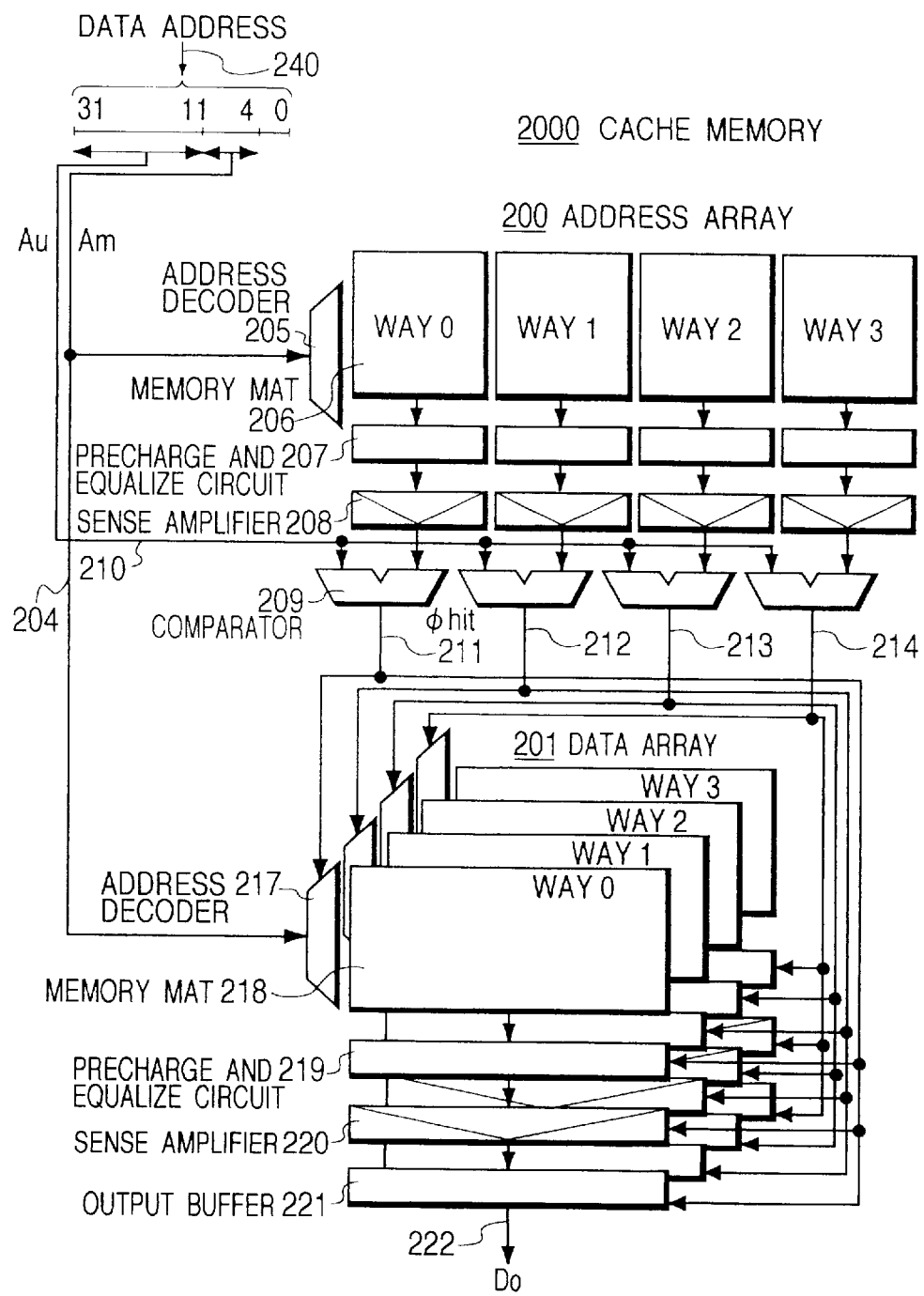
FIG. 2 is a schematic block diagram of a prior-art cache memory.

It should also be noted that the comparator 109 of each way of the address array 100 maintains its output φhit at high level (normally high) until the comparison in that comparator is established, in order to enable the data array 101 to be activated by the clock signal φ2 before the comparison result φhit is established. If a match has been found in that comparator, the same maintains its output φhit at high level; if no match has been found, that comparator sets its output φhit to low level. In this point of view, the comparator 109 as used herein is different from the comparator of the prior-art technology of FIG. 2 and the comparator used in the reference technology of FIG. 3.

(b) In the present embodiment, the operation of the way in the data array 101 corresponding to the mishit way of the address array 100 is stopped immediately. At this moment, the power consumption of the data array depends on how far the operation of the data array 101 has advanced at a time when the hit check operation in the address array 100 is completed. As will be described, if the result of hit check is determined before the sense amplifier 120 of FIG. 5 in the data array 101 is activated, this sense amplifier 120 will not be activated, so that the power consumption in the data array 101 decreases as compared with that of the reference technology of FIG. 3. Also, if the result of hit check is determined before the potential of a data line 502 of FIG. 5 of the data array 101 is fully changed immediately after the activation of the sense amplifier 120, it is no more necessary to fully charge the data line 502, resulting in a reduced power consumption by that amount.

The time difference in activation between the address array 100 and the data array 101 depends on the frequency of the first and second clock signals, so that the power consumption of the data array 101 depends on the clock frequency. To be specific, if the clock frequency is considerably higher than the above-mentioned threshold frequency, or the clock frequency is 60 MHz, for example, the time difference in activation between the address array 100 and the data array 101 gets smaller as shown in FIG. 6. Consequently, at completion of the hit check operation, the operation of the sense amplifier 120 of the data array 101 has been nearly completed and the potential change of the data line 502 has been completed. This indicates that, for the frequency as high as 60 MHz, for example, the power consumption of the data array 101 is not decreased greatly in comparison with the reference technology of FIG. 3. On the other hand, if the clock frequency is slightly higher than the threshold frequency, namely, if the clock frequency is 50 MHz, for example, the hit check operation is completed before the sense amplifier 120 of the data array 101 is activated, resulting in smaller power consumption than that of FIG. 3.

(c) If the frequency of the clock signal φ1 is low enough, the time difference between the clock signal φ1 and the clock signal φ2 gets larger, so that the clock signal φ2 rises after the signal φhit falls as shown in FIG. 8. As a result, only the hit way of the four ways of the data array is activated. This delays the rise time of the data array 101 but reduces its power consumption.

(d) Whether the high-speed operation is performed when the frequency of the clock signals φ1 and φ2 is high or the low-power-consumption operation is performed when the frequency is low depends on the timing in which the clock signal φ2 and other control signals are outputted and the timing in which the hit signal φhit is outputted from the address array. Consequently, depending on the frequency of the clock signals φ1 and φ2, the power consumption changes automatically.

In what follows, the circuit of FIG. 1 and the operations thereof will be described in detail.

(2) The address array 100

Figure 4:
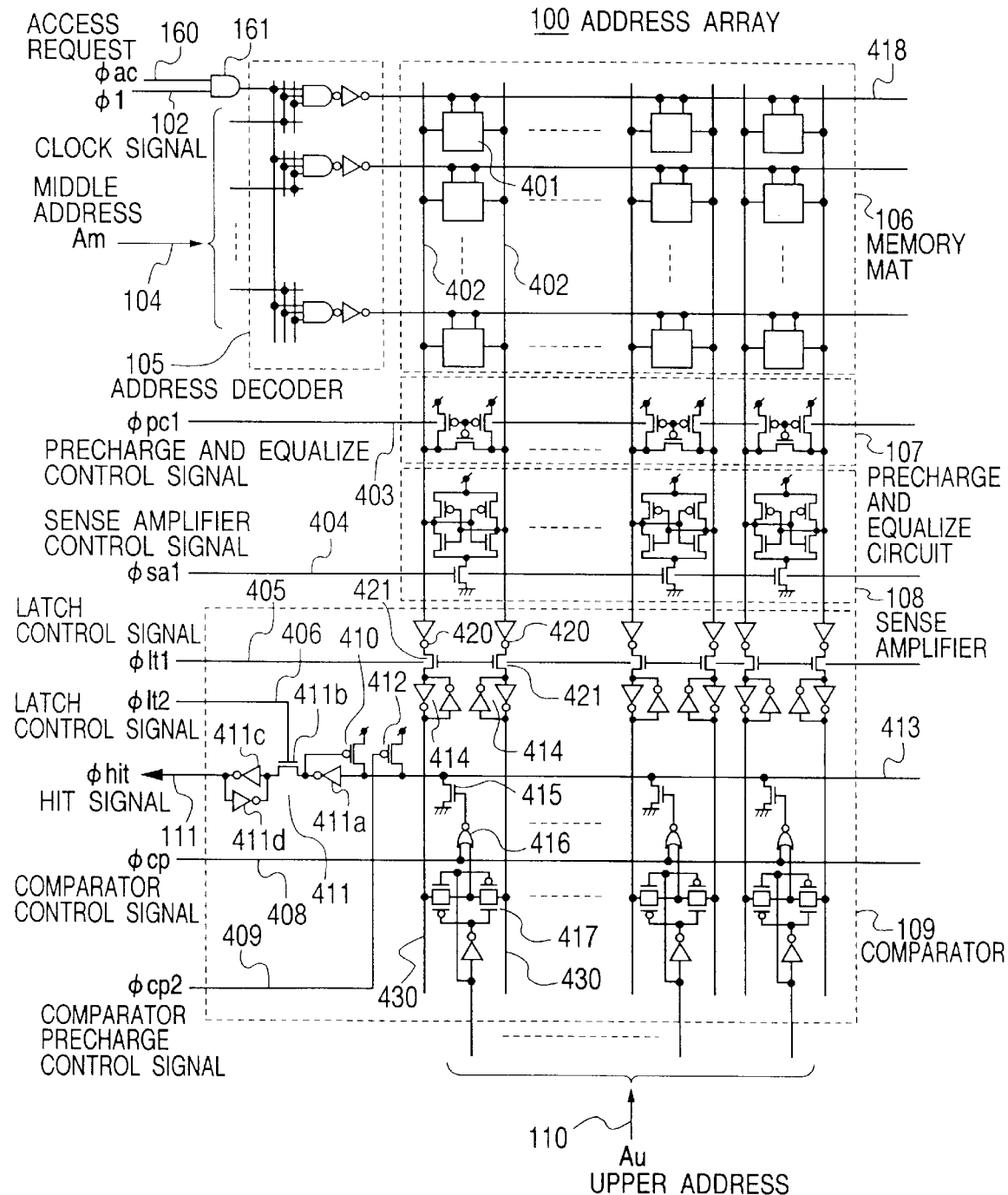
FIG. 4 is a circuit diagram of an address array used in the cache memory of FIG. 1.

FIG. 4 shows a detail of a portion associated with one of the ways in the address array 100. Each of the other ways has the same constitution. In the figure, in the memory mat 106 making up the address array 100, memory cells 401 are arranged in matrix. The memory cells 401 in each row are connected to a word line 418 provided for that row, and the memory cells in each column are connected to a pair of bit lines 402.

The address decoder 105 is supplied with a middle address Am via the line 104, within the memory reference addresses given from the CPU via the address bus 140. In response to the middle address Am, the address decoder 105 selectively drives a word line 418 of the memory mat 106. It should be noted that this drive is started when both the first clock signal φ1 and the memory access request φac given from the CPU are entered in an AND gate 161 and the output of this AND gate goes high. The potential of the selected word line changes as shown in a word line signal φwd1 of FIG. 6, 7 or 8. A signal stored in the memory cell 401 connected to this selected word line is supplied to the pair of bit lines 402 connected to each memory cell 401 to be amplified by the sense amplifier 108.

The precharge and equalize circuit 107 is composed of metal oxide semiconductor (MOS) transistor circuits provided for each column. Each transistor circuit is composed of a pair of p-channel MOS transistors for precharging the pair of bit lines belonging to the corresponding column and a p-channel MOS transistor for setting the potentials of that pair of bit lines to the same level. These MOS transistors circuits are activated by a precharge and equalize control signal φpc1 given via a line 403. As shown in FIG. 6, 7 or 8, the present embodiment is designed such that the bit line pair for each column are precharged before the signal stored in the memory cell is read; namely, the precharge and equalize control signal φpc1 rises before the word line signal φwd1 rises.

The sense amplifier 108 is composed of complementary metal oxide semiconductor (CMOS) transistor circuits for differentially amplifying the potentials of the pair of bit lines to set one line to high level and the other line to low level. These CMOS transistor circuits are activated by a sense amplifier control signal φsa1 given via a line 404.

In the comparator 109, the potentials of the bit line pair of each column amplified by the sense amplifier 108 are inverted by inverters 420, and are captured by latches 414 each composed of two inverters via signal-capturing n-channel MOS transistors 421. The pair of signals of the bit line pair are held as the potential of a pair of latch signal lines 430 connected to the latches 414. These latch control n-channel MOS transistors 421 are turned on by a latch control signal φlt1 given from the address array controller 150 via a line 405.

Further, a compare CMOS transistor circuit 417 compares signals on the pair of latch signal lines 430 for the column concerned with corresponding bits of the upper address Au in the memory reference address given in synchronization with the clock signal φ1 via the line 110. If a match is found, a high-level signal is supplied to a NOR gate 416 provided for that column. The NOR gate 416 is supplied with a comparator control signal φcp from the address array controller 150 via a line 408. This signal φcp goes low when the NOR gate 416 responds to the output of the comparison CMOS transistor circuit 417. Therefore, the output of the NOR gate 416 goes low if a match is found by the compare CMOS transistor circuit 417 but remains high if no match is found.

The output of the NOR gate 416 for each column is supplied to the gate of a discharge n-channel MOS transistor 415 provided for that column. The drains of the discharge MOS transistors 415 provided for plural columns are connected to a compare result output line 413 commonly provided for the columns. In response to a precharge control signal φpc2 given from a line 409, a p-channel MOS transistor 412 precharges the compare result output line 413 before the above-mentioned compare operation is performed. Reference numeral 410 indicates a leak current compensating p-channel MOS transistor. The discharge n-channel MOS transistors 415 provided for the columns constitute a NOR circuit together with the common signal line 413. Therefore, when the comparator control signal φcp goes low and if a mismatch is found by the compare CMOS transistor circuit 417 for one of the columns, this common signal line 413 is discharged to low level.

The potential of this compare result output line 413 is supplied to an inverter 411a and further to a signal capture n-channel MOS transistor 411b. This transistor 411b is turned on when a latch control signal φlt2 is given from the address array controller 150 via a line 406. A latch 411 composed of two inverters 411c and 411d connected in parallel captures the potential of the compare result output line 413, the captured signal being inverted by the inverter 411c to be outputted to a line 111 as the φhit signal. This output φhit is equivalent to a signal obtained by inverting twice the potential of the compare result output line 413 by the two inverters 411a and 411b, so that the signal φhit is high before the compare operation is performed in the comparator 417 for each column. After the compare operation has been performed, the signal φhit remains high if a match is found in all columns; if a mismatch is found in some column, the signal φhit goes low. Thus, in the present embodiment, before the address comparison is established, the latch 111 outputs the high level of the compare result output line 413, just after precharging, and, after the compare result is established, outputs the high level or the low level depending on whether the comparison has resulted in a match or a mismatch.

Referring to FIG. 6, when the frequency of the clock signal φ1 is considerably high, namely considerably higher than the threshold frequency mentioned before, that is, if the clock frequency is, for example, 60 MHz, the hit signal φhit is established about ¾ period after rising of the clock signal φ1. Further, as shown in FIG. 7, when the clock signal φ1 is somewhat high, namely slightly higher than the threshold frequency, that is, if the clock frequency is, for example, 50 MHz, the hit signal φhit is established about ½ period after rising of the clock signal φ1. On the other hand, when the frequency of the clock signal φ1 is somewhat lower than the threshold frequency, that is, if the clock frequency is, for example, 10 MHz, the hit signal φhit is established about ¼ period after rising of the clock signal φ1.

(3) The data array 101
(3a) Circuit structure

Figure 5:
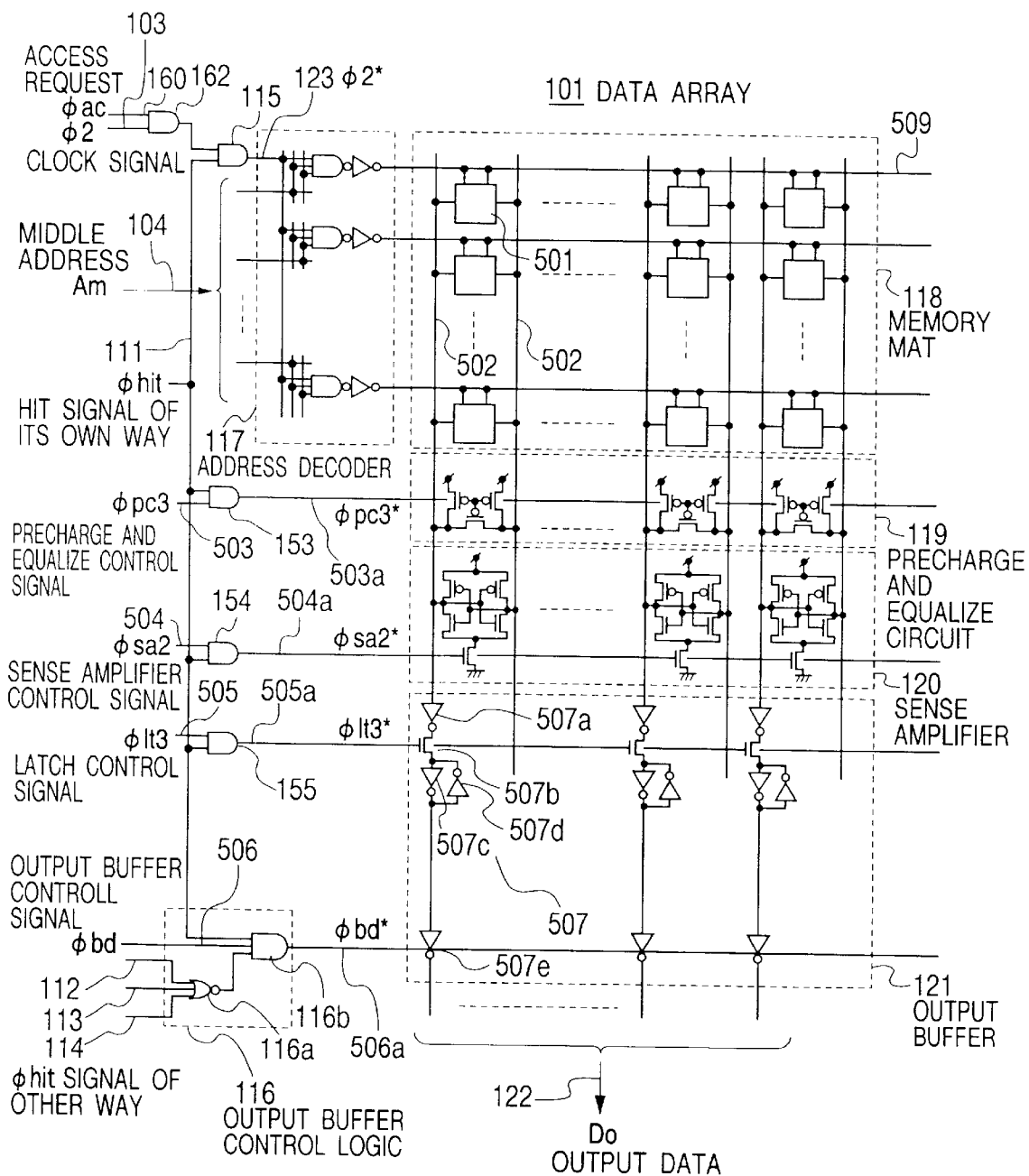
FIG. 5 is a circuit diagram of a data array used in the cache memory of FIG. 1.

FIG. 5 shows a circuit diagram of the data array 101. FIG. 5 shows only a portion for one way because the other portions for the other ways have generally the same construction as that of the portion shown. In the figure, reference numeral 118 indicates a memory mat, reference numeral 501 indicates a memory cell, reference numeral 502 indicates a pair of bit lines, reference numeral 509 indicates a word line, reference numeral 117 indicates an address decoder, reference numeral 119 indicates a precharge and equalize circuit, and reference numeral 120 indicates a sense amplifier. The structure and operations of these circuit components are generally the same as those of the circuit components of the address array 100. Therefore, the description of these circuit components of FIG. 5 will be omitted from hereinafter. Further, in FIG. 5, reference numeral 121 indicates an output buffer, reference numeral 116 indicates an output buffer control logic, and reference numerals 115, 153, 154, and 155 indicate AND gates, all of which are not used in the address array 100.

The AND gate 115 activates the address decoder 117 in response to the second clock signal φ2 given from a clock generator, not shown, via the line 103, the output of an AND gate 162 in which a memory access request φac is entered from the CPU, not shown, and a hit signal φhit for the corresponding way. When activated, the address decoder 117 in turn selectively activates one of the word lines in response to a middle address Am supplied from the line 104.

The AND gate 153 supplies a precharge and equalize control signal φpc3 given from the data array controller 151 via a line 503 to the precharge and equalize circuit 119 via a line 503a in response to the hit signal φhit.

The AND gate 154 supplies a sense amplifier control signal φsa2 given from the data array controller 151 via a line 504 to the sense amplifier 120 via a line 504a in response to the hit signal φhit. The AND gate 155 supplies a latch control signal φlt3 given from the data array controller 151 via a line 505 to the output buffer 121 via a line 505a in response to the hit signal φhit.

The output buffer 121, provided for the memory cells of each column, is composed of a circuit 507 for latching a signal detected for that column. This latch circuit 507 is in practice composed of a first inverter 507a connected to one bit line of each column, an n-channel MOS transistor 507b for signal capture, a pair of inverters 507c and 507d for holding the captured signal, and an output control inverter 507e for controlling the output of the signal held in the pair of inverters to the line 122.

The output buffer control logic 116, connected to the output buffer 121 via the line 506, controls the output buffer 121 such that data is outputted from the output buffer 121 of the way shown in FIG. 5 of the data array 101 to the output line 122 when a way corresponding to one way shown in FIG. 4 among the four ways in the address array 100 hits and the other ways mishit. To be more specific, the output buffer control logic 116 is composed of an AND gate 116b for supplying an output buffer control signal φbd given from the data array controller 151 via the line 506 to the output buffer 121 in response to the hit signal φhit associated with the way shown and a NOR gate 116a of the hit check signals φhit associated with the other ways for checking if all the other ways mishit. When this NOR gate is high, the output buffer control signal φbd is prohibited from being transferred from the AND gate 116b by the output of this NOR gate.

(3b) High-speed operation As described above, in the present embodiment, the hit signal φhit is kept high until the comparison in the address array is established, the high level being the level to which this signal is to be set when an actual hit occurs. In the present embodiment, a clock signal delayed behind the first clock signal φ1 by ¼ period is used for the second clock signal φ2. As shown in FIG. 6 or 7, when the clock frequency is somewhat high, the hit signal φhit is still high for any of the ways at the time when the clock signal φ2 is given, so that all of the ways of the data array 101 are activated. Subsequently, the precharge and equalize control signal φpc3 is supplied to the precharge and equalize circuit 119 via the gate 153, upon which voltage φwd2 of the selected word line goes up. Further, the sense amplifier control signal φsa2 and the latch control signal φlt3 are supplied to the sense amplifier 120 and the output buffer 121 via the gates 154 and 155 respectively, causing the output buffer 121 to latch information read from the selected word line. In the present embodiment, these operations are performed before the hit signal φhit is established, making the signal latched in each way readily available at the moment when the hit signal φhit is outputted.

At that time, the output buffer control logic 116 operates such that only the read data for the hit way is outputted to the output line 122, among the read data latched by the output buffers 121 of each way. Namely, the NOR gate 116a in the output buffer control logic 116 for each way goes high when all hit signals φhit for the other ways are all low. However, as described before, before the hit check is established, the hit signals φhit of all ways are high. Therefore, the outputs of the NOR gates 116a of all ways are low. Consequently, in this state, the output of the AND gate 116b remains off even if supplied with the output buffer control signal φbd from the data array controller 151, no read data being outputted from the output buffer of any of the ways. Therefore, if the clock signal having the somewhat high frequency of FIG. 6 is used, the data array controller 151 supplies the output buffer control signal φbd immediately after the end of the hit check in the address array 100.

When the hit signal φhit is established as a result of the hit check in the address array 100, the hit signal φhit for the way that has hit, the way 0 for example, remains high, while the hit signals φhit for the ways that have mishit, the ways 1 through 3 for example, all go low. Consequently, the output of the NOR gate of the output buffer control logic 116 of the way 0 of the data array 101 goes high, upon which the output buffer control signal φbd is supplied to the output control inverter 507e via the AND gate 116b and the line 506a and the read data is outputted to the line 122 only from the output buffer 121 of the way 0 that has hit. Thus, the novel constitution is also advantageous in that the above-mentioned operations can be performed normally even if there is a fluctuation between the timings of the outputs of the hit signals φhit from the ways in the address array 100.

Further, in the way that has hit, the hit signal φhit remains high, so that the AND gates 115, 153, 154, and 155 remain on, leaving the operation of the circuit of this way unchanged. On the other hand, in the ways that have mishit, the hit signal φhit goes low, thereby turning off these AND gates. This causes the precharge and equalize circuit 119, the sense amplifier 120, and the output buffer 121 to stop the operations thereof. It should be noted, as seen from the above description, that, if the address array 100 has not hit, or any of the ways of the address array 100 has not hit, the hit signal φhit goes low for each way. At this moment, all the ways of the data array 101 stop operating, so that the data array 101 will not output data.

Thus, the power consumption of the data array 101 at the time when the operation of the way of the data array 101 corresponding to the way that has mishit of the address array has stopped depends on how far the operation of the data array 101 has advanced until the time of completion of the hit check in the address array 100.

Referring to FIG. 6, when the clock frequency is considerably higher than the threshold frequency, namely, if the clock frequency is 60 MHz, for example, the time difference in activation between the address array 100 and the data array 101 gets relatively small. Therefore, at the completion of the hit check, the operation of the sense amplifier 120 of the data array 101 has been nearly completed and the change in the potential of the data line 502 has been completed. It is apparent, therefore, that, for such a high frequency, the power consumption of the data array 101 does not decrease much as compared with the power consumption of the reference technology of FIG. 3.

Figure 3:
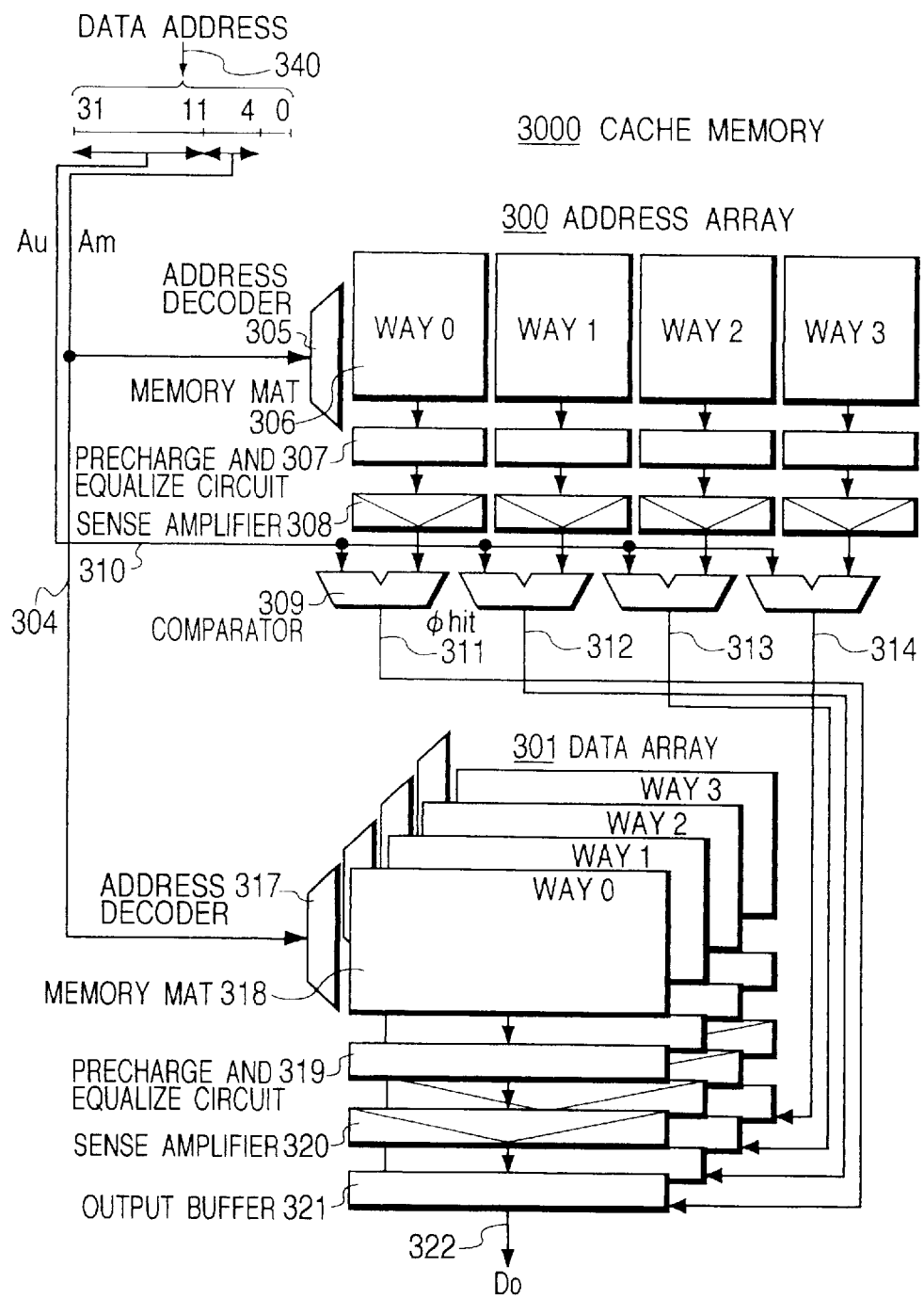
FIG. 3 is a schematic block diagram of a cache memory that the present inventors have derived from the prior-art.

On the other hand, when the clock frequency is somewhat higher than the threshold frequency, namely if the clock frequency is 50 MHz, for example, the hit check is completed before the sense amplifier 120 of the data array 101 is activated, so that no power consumption occurs in this sense amplifier, resulting in smaller power consumption than that of the reference technology of FIG. 3.

It should be noted that, if the clock frequency is between 50 MHz and 40 MHz, the result of the hit check may be determined before the potential of the data line 502 of the data array 101 has been fully changed after the activation of the sense amplifier 120. In this case also, the power consumption decreases because the data line 502 need not be fully charged. Thus, in the present embodiment, if the clock frequency used is set to an appropriate level, the comparatively high speed operation with reduced power consumption can be realized.

As apparent from the above description, the access time of the cache memory of the present embodiment is a sum of the time from the assertion of the first clock signal φ1 to the assertion of the second clock signal φ2 and the access time of the data array 101. Since the former time can be made shorter than the address array operating time, the cache memory of the present embodiment provides high-speed operations if the operating frequency thereof is relatively high.

(3c) Low-speed operation As compared with the timings of FIGS. 6 and 7, the timing of FIG. 8 is characterized by that the second clock signal φ2 is asserted after the establishment of the result of the comparison between an address in the address array 100 and the upper address Au. In FIG. 8, the address array 100 operates in generally the same sequence as that of FIGS. 6 and 7, outputting the hit signal φhit to the data array 101. At this moment, the data array 101 has not yet been activated because the clock signal φ2 has not been asserted. The address decoder 117 of the data array 101 is controlled by performing an AND operation between the clock signal φ2 and the hit signal φhit, so that, when the clock φ2 is asserted presently, the data array 101 is activated only in the way in which the hit signal φhit has been asserted, namely the way that has hit.

When the clock signal φ2 has been asserted and the word line 509 corresponding to the middle address Am is selected, data is read from the memory cell 501 to be sent to the sense amplifier 120 via the bit line 502. Giving the sense amplifier control signal φsa2 in the timing of FIG. 8 amplifies the data put on the bit line 502 to be sent to the latch 507. Giving the latch control signal φlt3 in the timing of FIG. 8 latches the amplified data in the latch 507. Further, giving the output buffer control signal φbd in the timing of FIG. 8 externally outputs the data from the latch. At this moment, however, since the hit signal φhit has been established before the activation of the data array, all the circuits subsequent to the address decoder 117 operate only in one way that has hit. Consequently, if the operating frequency is relatively low, the data array 101 operates only in the way that has hit, thereby saving the power consumption.

Thus, with the phase difference between the first and second clock signals kept constant, lowering the frequencies of these signals can activate the data array 101 after the establishment of the hit signal φhit. Conversely, it is required to determine the phase difference so that the data array 101 can be activated at a predetermined frequency, for example 10 MHz, of these clock signals.

As apparent from the description so far, the cache memory of the present embodiment operates at relatively high speeds when the operating frequency is considerably higher than the threshold frequency, while the same operates in a low power consumption mode when the operating frequency is considerably lower. And switching between these two modes can be performed automatically. Further, when the operating frequency is somewhat higher than the threshold frequency, the cache memory operates at somewhat high speeds while lowering the power consumption.

Modifications:

(1) The above mentioned embodiment discloses a four-way set-associative cache memory. The present invention is also applicable to a cache memory composed of one or more ways other than four ways.

(2) In the above-mentioned embodiment, the clock signal φ1 is supplied to the address array 100 and the CPU 805 and the clock signal φ2 having a phase different from that of the clock signal φ1 is supplied to the data array 101. Instead, the clock φ1 can be supplied to the address array 100 and the clock φ2 having a phase different from that of the clock φ1 can be supplied to the CPU 805 and the data array 101 without impairing the advantages to be obtained by the invention.

(3) In the above-mentioned embodiment, the present invention is applied to the cache memory installed on the microprocessor. Instead, the invention is applicable to the cache memory installed on other devices.

As described and according to the invention, a cache memory is provided which operates relatively high speeds and, in a low-speed operation, lowers the power consumption. In addition, a cache memory is provided which operates at somewhat high speeds and relatively low power consumption when an appropriate clock frequency is selected.

While the preferred embodiments of the present invention have been described using specific terms, such description is for illustrative purposes only, and it is to be understood that changes and variations may be made without departing from the spirit or scope of the appended claims.

What is claimed is:

1. A cache memory comprising:

a data array for holding a plurality of pieces of data corresponding to a plurality of pieces of data held in another memory;

an address array for holding a plurality of address information associated with pieces of addresses of said another memory for said plurality of pieces of data held in said data array;

a first activating circuit responsive to a read request which requests readout of data from said another memory, for activating said address array to read a piece of address information therefrom associated with a read address specified by said read request;

a hit check circuit for performing hit check on said read address based on the piece of address information read from said address array;

a second activating circuit for activating said data array to read data associated with said read address, said activating being done after said address array is activated; and an output control circuit for instructing said data array to output said data associated with said read address and read by activation of said data array, in response to determination as a result of said hit check that said address array has hit;

wherein said second activating circuit has an activation execution circuit for dynamically selecting and executing one of first activating operation for activating said data array after activation of said address array and before completion of said hit check and a second activating operation for activating said data array after said hit check completes and determines that said address array has hit.

2. The cache memory according to claim 1, wherein said activation execution circuit has a circuit for selectively executing one of said first activating operation and said second activating operation depending on a clock frequency of a clock signal for controlling operations of said cache memory.

3. The cache memory according to claim 2, wherein said circuit in said activation execution circuit has a circuit for executing said first activating operation when said clock frequency is a first frequency which is relatively high and for executing said second activating operation when said clock frequency is a second frequency which is relatively low.

4. The cache memory according to claim 1 wherein:

said first activating circuit has a circuit for activating said address array in response to combination of a clock signal for controlling operations of said cache memory and said read request;

said second activating circuit has a circuit for activating said data array after activation of said address array, in response to another clock signal that has the same clock frequency as that of said clock signal and is delayed behind said clock signal by a predetermined phase difference, thereby to change timing for activating said data array to one located before or after completion of said hit check, depending on said clock frequency and said predetermined phase difference; and said predetermined phase difference is predetermined such that the timing for activating said data array is located before completion of said hit check, when said clock frequency is a first frequency which is relatively high, and the timing for activating said data array is located after completion of said hit check, when said clock frequency is a second frequency which is relatively low.

5. The cache memory according to claim 4, wherein said phase difference is predetermined such that said timing for activating said data array is one which enables data reading by said data array to be completed before completion of said hit check, when said clock frequency is a third frequency which is higher than said first frequency which is relatively high.

6. The cache memory according to claim 4, wherein said phase difference is predetermined such that said timing for activating said data array is one which enables data reading by said data array to be completed after completion of said hit check, when said clock frequency is said first frequency which is relatively high.

7. The cache memory according to claim 6, further comprising a circuit for instructing said data array to stop a data read operation under execution, when it is determined by said hit check that said address array has mishit, when said clock frequency is said first frequency which is relatively high.

8. The cache memory according to claim 4, wherein:
said data array comprises into a plurality of data holding ways for holding a plurality of pieces of data, each piece of data being a copy of data held in said another memory;
said address array comprises into a plurality of address information holding ways each provided in correspondence to one of said plurality of data holding ways, each address information holding way holding a plurality of pieces of address information associated with memory addresses of said another memory for a plurality of pieces of data held in a corresponding one of said plurality of data holding ways;
said first activating circuit has a circuit for activating said plurality of address information holding ways in parallel, in response to combination of said read request and said clock signal;
said hit check circuit has a circuit for executing hit check on respective ones of a plurality of pieces of address information read from said plurality of address information holding ways with respect to said read address, in parallel;
said first activating operation activates said plurality of data holding ways in parallel before end of hit check performed to respective ones of said plurality of address information holding ways; and
said second activating operation selectively activates one of said plurality of data holding ways corresponding to one of said plurality of address information holding ways, after the hit check performed to respective ones of said plurality of address information holding ways has completed and the hit check has determined that said one address information holding way has hit.

9. The cache memory according to claim 8,
wherein said phase difference is predetermined such that a timing for activating said data array is one which enables data reading by each data holding way to be completed after completion of said hit check on an address information holding way corresponding to said each data holding way, when said clock frequency is said first frequency which is relatively high; and,
wherein said cache memory further comprises a circuit for instructing one data holding way corresponding to one address information holding way to stop a data read operation under execution, when said clock frequency is said first frequency which is relatively high and said hit check circuit has determined that said one address information holding way has mishit.

10. The cache memory according to claim 8, wherein said phase difference is predetermined such that a timing for activating said data array is one which enables data reading by said data array to be completed before completion of said hit check, when said clock frequency is a third frequency higher than said first frequency which is relatively high.

11. A cache memory comprising:
a data array comprises a plurality of data holding ways for holding a plurality of pieces of data, each piece of data being a copy of data held in another memory;
an address array comprises a plurality of address information holding ways each provided in correspondence to one of said plurality of data holding ways, each address information holding way holding a plurality of pieces of address information associated with memory addresses of said another memory for a plurality of pieces of data held in a corresponding one of said plurality of data holding ways;
a first activating circuit responsive to a data read request which requests readout of data from said another memory, for activating said plurality of address information holding ways in parallel, to read a plurality of pieces of address information associated with a memory read address specified by said data read request;
a hit check circuit for executing a hit check on respective ones of said plurality of address information holding ways with respect to said memory read address in parallel, based on a plurality of pieces of address information read from said plurality of address information holding ways;
a second activating circuit for activating said plurality of data holding ways in parallel, to read a plurality of pieces of data associated with said memory read address therefrom, said activating being done after activation of said plurality of address information holding ways and before completion of the hit check on respective ones of said plurality of address information holding ways; and
an output control circuit for instructing one of said plurality of data holding ways corresponding to one of said plurality of address information holding ways to output data read by the one corresponding data holding has, in response to determination by said hit check that said one address information holding way was hit.

12. The cache memory according to claim 11, wherein:
said second activating circuit has a circuit for activating said plurality of data holding ways at a timing which enables reading in said plurality of data holding ways be completed after completion of the hit check associated with said plurality of address information holding ways; and
said cache memory further comprises a circuit for instructing one of said plurality of data holding ways that corresponds to one of said plurality of address information holding ways to stop a data read operation under execution, if the hit check has determined that said one address information holding way has mishit.

13. A cache memory comprising:
a data array for holding a plurality of pieces of data corresponding to a plurality of pieces of data in another memory;
an address array for holding a plurality of pieces of address information associated with addresses of said another memory for said plurality of pieces of data held in said data array;
a first activating circuit responsive to combination of a data read request which requests readout of data from said another memory and a first clock signal which controls an operation of said cache memory, for activating said address array to read a piece of address information associated with a read address specified by said data read request;
a hit check circuit for executing hit check on said piece of address information read from said address array with respect to said read address;
a second activating circuit responsive to a second clock signal having the same clock frequency as that of said first clock signal and delayed behind said first clock signal by a predetermined phase difference, for activating said data array after activation of said address array, to read data associated with said read address; and an output control circuit responsive to determination by said hit check that said address array has hit, for instructing said data array to output data read by the activating of said data array.

14. The cache memory according to claim 13 wherein said predetermined phase difference is substantially constant without depending upon said clock frequency.

15. The cache memory according to claim 14 wherein:

said data array comprises into a plurality of data holding ways for holding a plurality of pieces of data, each piece of data being a copy of data held in said another memory;

said address array comprises into a plurality of address information holding ways each provided in correspondence to one of said plurality of data holding ways, each address information holding way holding a plurality of pieces of address information associated with memory addresses of said another memory for said plurality of pieces of data held in a corresponding one of said plurality of data holding ways;

said first activating circuit has a circuit for activating a plurality of address information holding ways in parallel, in response to combination of said read request and said first clock signal;

said hit check circuit has a circuit for executing hit check on respective ones of a plurality of pieces of address information read from said plurality of address information holding ways with respect to said read address, in parallel;

said second activating circuit has a circuit responsive to said second clock signal, for activating said plurality of data holding ways after activating of said plurality of address information holding ways, to read a plurality of pieces of data associated with said read address; and said output control circuit has a circuit responsive to determination by said hit check that one of said plurality of address information holding ways has hit, for instructing one of said plurality of data holding ways that corresponds to said one address information holding way, to output data read from the one corresponding data holding way.

16. The cache memory according to claim 15 wherein:

said hit check circuit comprises a plurality of hit check circuits each provided in correspondence to one of said plurality of address information holding ways;

each hit check circuit has a circuit for outputting a hit signal before hit check for a corresponding address information holding way is completed and outputting a mishit signal at completion of the hit check for said corresponding address information holding way, if the corresponding address information holding way has mishit; and said instructing circuit in said output control circuit has a circuit responsive to a hit signal given from one of said plurality of hit check circuits and mishit signals respectively given from hit check circuits other than said one hit check circuit, for instructing one of said plurality of data holding ways that corresponds to said one hit check circuit to output data read by the one corresponding data holding way.

17. The cache memory according to claim 14, wherein said predetermined phase difference is predetermined such that a timing at which said data array is activated is located before completion of said hit check and after activation of said address array, when said clock frequency is a first frequency which is relatively high, and the timing in which said data array is activated is located after completion of said hit check, when said clock frequency is a second frequency which is relatively low.

18. The cache memory according to claim 17, wherein said phase difference is predetermined such that the timing in which said data array is activated is one which enables data reading by said data array to be completed before completion of said hit check, when said clock frequency is a third frequency which is higher than said first frequency which is relatively high.

19. The cache memory according to claim 17, wherein said predetermined phase difference is predetermined such that the timing in which said data array is activated is one which enables data reading by said data array to be completed after completion of said hit check, when said clock frequency is said first frequency which is relatively high.

20. The cache memory according to claim 19, further comprising a circuit for instructing said data array to stop data reading in execution, if said hit check determines that said address array has not hit, when said clock frequency is said first frequency which is relatively high.

21. A microprocessor comprising:

a central processing unit;

a cache memory connected to said central processing unit, said cache memory comprising:

a data array for holding a plurality of pieces of data corresponding to a plurality of pieces of data held in another memory;

an address array for holding a plurality of pieces of address information associated with addresses of said another memory for said plurality of pieces of data held in said data array;

a first activating circuit responsive to a read request which requests readout of data from said another memory, for activating said address array to read a piece of address information therefrom associated with a read address specified by said read request, a hit check circuit for performing hit check on said read address based on the piece of address information read from said address array;

a second activating circuit for activating said data array to read data associated with said read address, said activating being done after said address array is activated; and an output control circuit for instructing said data array to output said data associated with said read address and read by activation of said data array, in response to determination as a result of said hit check that said address array has hit;

wherein said second activating circuit has an activation execution circuit for dynamically selecting and executing one of a first activating operation for activating said data array after activation of said address array and before completion of said hit check and a second activating operation for activating said data array after said hit check completes and determines that said address array has hit; and a clock supply circuit for supplying a plurality of clock signals for controlling operations of said central processing unit and said cache memory to said cache memory;

wherein said central processing unit, said cache memory, and said clock supply circuit are provided on a common integrated circuit substrate.

22. A microprocessor comprising:

a central processing unit;

a cache memory connected to said central processing unit, said cache memory comprising:

a data array comprises a plurality of data holding ways for holding a plurality of pieces of data, each piece of data being a copy of data held in another memory;

an address array comprises a plurality of address information holding ways each provided in correspondence to one of said plurality of data holding ways, each address information holding way holding a plurality of pieces of address information associated with memory addresses of said another memory for a plurality of pieces of data held in a corresponding one of said plurality of data holding ways;

a first activating circuit responsive to a data read request which requests readout of data from said another memory, for activating said plurality of address information holding ways in parallel, to read a plurality of pieces of address information associated with a memory read address specified by said data read request;

a hit check circuit for executing hit check on respective ones of said plurality of address information holding ways with respect to said memory read address in parallel, based on a plurality of pieces of address information read from said plurality of address information holding ways;

a second activating circuit for activating said plurality of data holding ways in parallel to read a plurality of pieces of data associated with said memory read address therefrom, said activating being done after activation of said plurality of address information holding ways and before completion of the hit check; and an output control circuit for instructing one of said plurality of data holding ways corresponding to one of said plurality of address information holding ways to output data read by the one corresponding data holding way, in response to determination by said hit check that, said one address information holding way has hit; and a clock supply circuit for supplying a plurality of clock signals for controlling operations of said central processing unit and said cache memory to said cache memory;

wherein said central processing unit, said cache memory, and said clock supply circuit are provided on a common integrated circuit substrate.

23. A microprocessor comprising:

a central processing unit;

a cache memory connected to said central processing unit, said cache memory comprising:

a data array for holding a plurality of pieces of data corresponding to a plurality of pieces of data held in another memory;

an address array for holding a plurality of pieces of address information associated with addresses of said another memory for said plurality of pieces of data held in said data array;

a first activation circuit responsive to combination of a data read request which requests readout of data from said another memory and a first clock signal which controls an operation of said cache memory, for activating said address array to read a piece of address information associated with a read address specified by said data read request;

a hit check circuit for executing hit check on said piece of address information read from said address array with respect to said read address;

a second activating circuit responsive to a second clock signal having the same clock frequency as that of said first clock signal and delayed behind said first clock signal by a predetermined phase difference, for activating said data array after activation of said address array, to read data associated with said read address; and an output control circuit responsive to determination by said hit check that said address array was hit, for instructing said data array to output data read by the activating of said data array; and a clock supply circuit for supplying said first clock signal and said second clock signal to said cache memory;

wherein said central processing unit, said cache memory, and said clock supply circuit are provided on a common integrated circuit substrate.

* * * * *